United States Patent [19]

Koch et al.

[11] Patent Number: 5,109,162
[45] Date of Patent: Apr. 28, 1992

[54] REVERSE POLARITY FLYBACK SWITCH

[75] Inventors: Daniel S. Koch, Tremont; William H. Lueckenbach, Peoria; Daniel C. Wood, East Peoria, all of Ill.

[73] Assignee: Caterpillar Inc., Peoria, Ill.

[21] Appl. No.: 521,214

[22] Filed: May 9, 1990

[51] Int. Cl.⁵ .............................................. H02H 3/18
[52] U.S. Cl. ..................................... 307/127; 361/84; 320/25
[58] Field of Search ............... 307/127, 126, 125, 112, 307/116, 130, 10.7, 31, 39; 361/82, 84, 77, 79, 139, 160, 245; 320/25, 26

[56] References Cited

U.S. PATENT DOCUMENTS

| | | | |
|---|---|---|---|
| 4,679,112 | 7/1987 | Craig | 361/84 |
| 4,924,122 | 5/1990 | Harris | 307/116 |
| 4,949,215 | 8/1990 | Studtmann et al. | 361/160 |
| 4,967,309 | 10/1990 | Hoffman | 361/160 |
| 4,992,683 | 2/1991 | Robin, Jr. | 307/127 |

Primary Examiner—A. D. Pellinen
Assistant Examiner—Richard Elms
Attorney, Agent, or Firm—Kirk A. Vander Leest

[57] ABSTRACT

The subject invention provides a coil driver circuit having protection against a reverse-polarity battery connection and is suitable for use in such control modules. The driver circuit controllably actuates N coils in response to control signals supplied by the control module. The driver circuit includes N control switches, each coupled in series between a first terminal of an associated one of the coils and a first common junction. The first common junction is normally connected to a positive reference terminal of the electrical power source. The control switches are adapted to controllably connect the coil first terminals to the power source positive reference terminal in response to externally supplied control signal. The coils have second terminals connected at a second common junction, and the second common junction is normally connected to a negative reference terminal of said power source. N flyback diodes, each having a cathode connected to a respective coil first terminal and an anode connected to a third common junction. The third common junction is normally connected to the power source negative reference terminal. A circuit is provided for sensing a reverse-polarity battery connection and responsively disconnecting the diodes from the third junction.

5 Claims, 3 Drawing Sheets

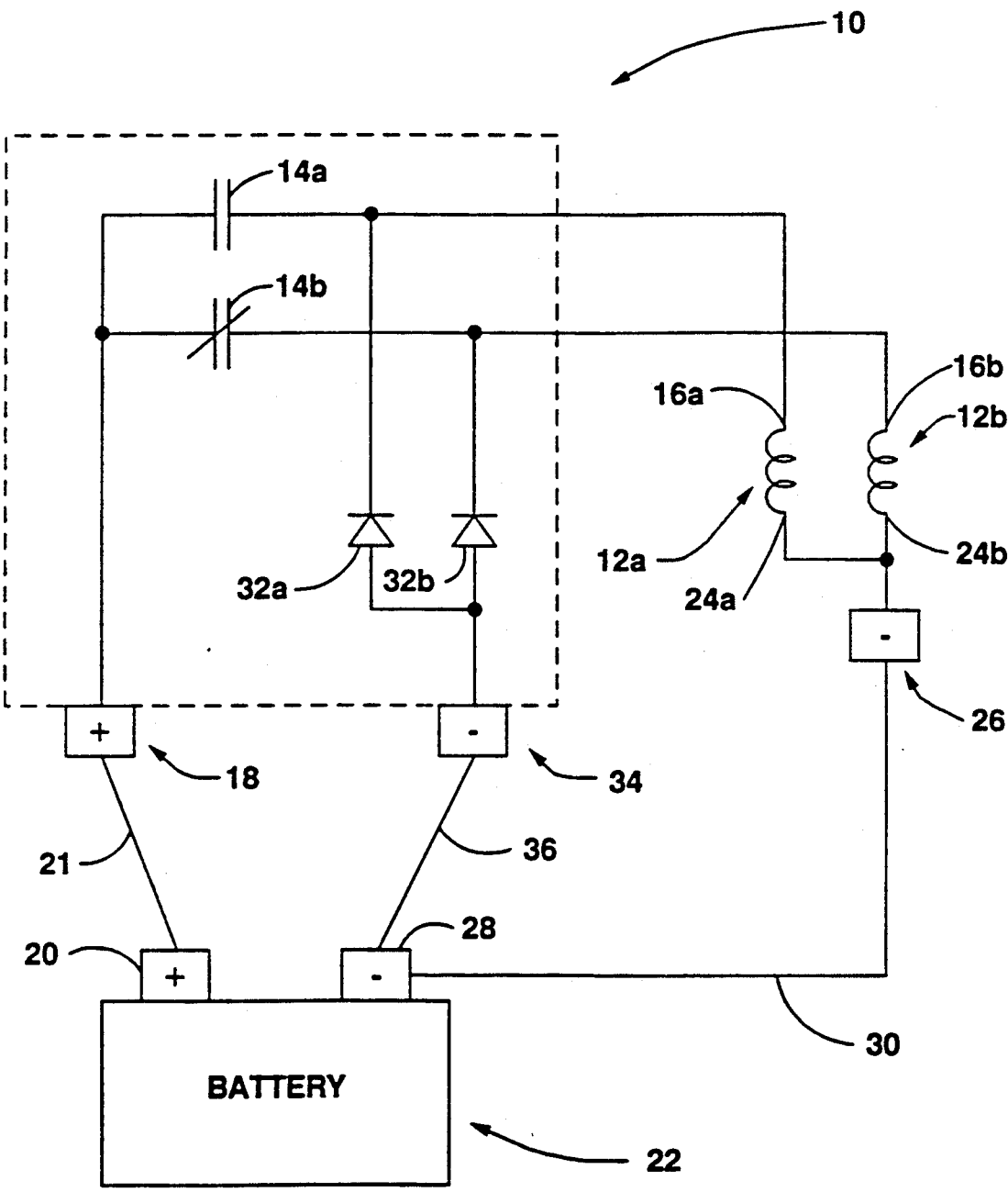
PRIOR ART
Fig_1A_

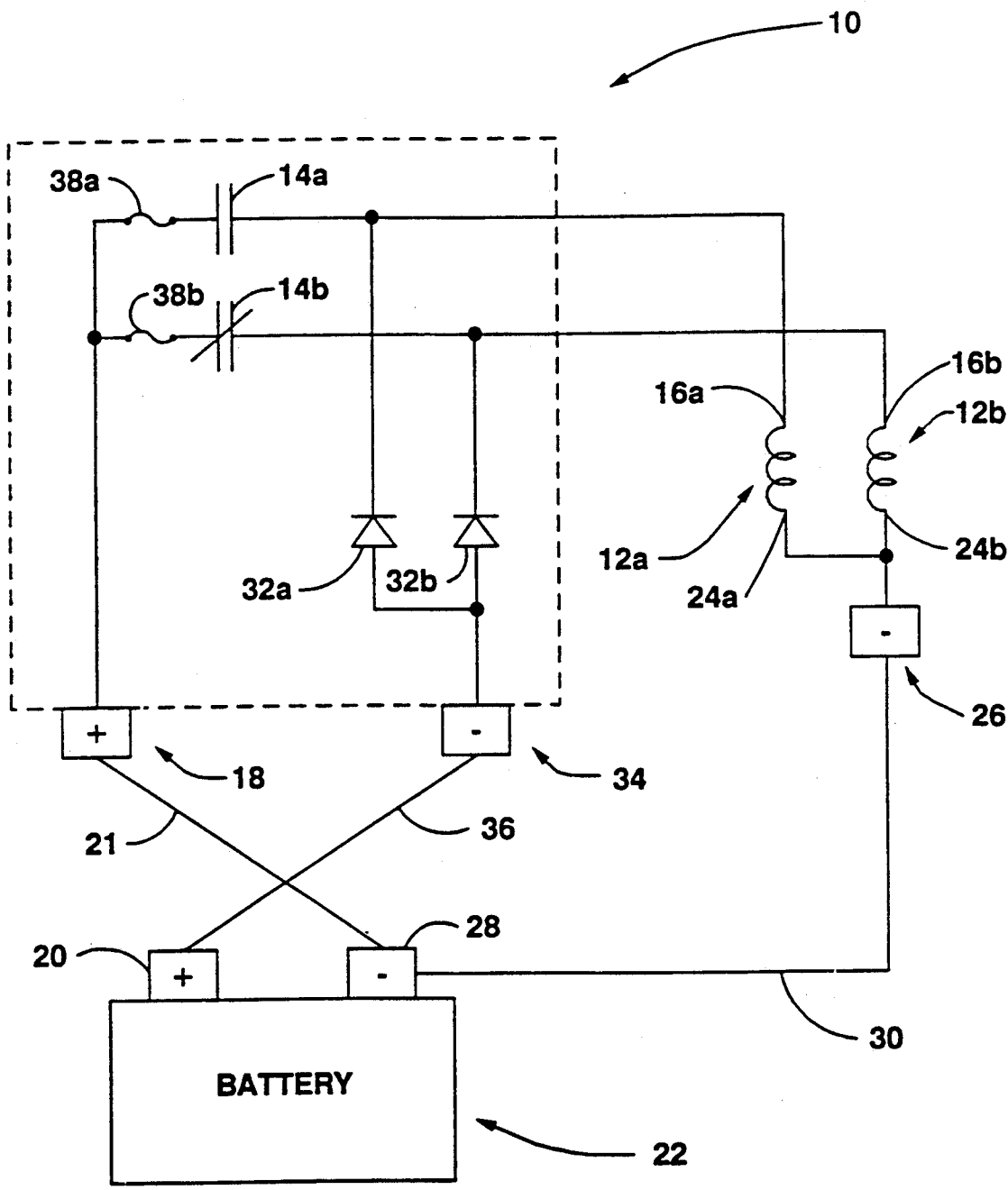
PRIOR ART
Fig_1B_

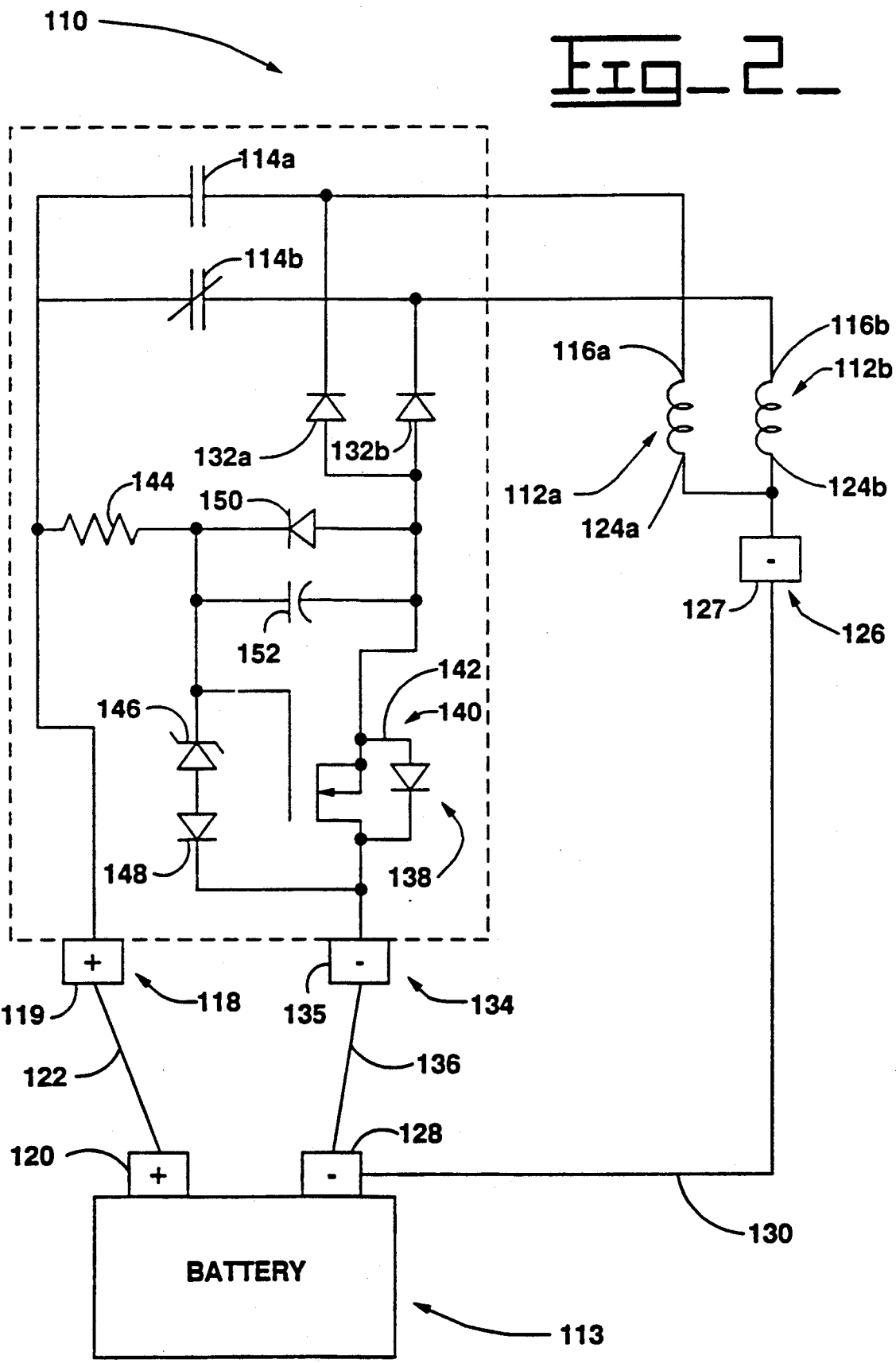
Fig_2_

REVERSE POLARITY FLYBACK SWITCH

TECHNICAL FIELD

This invention relates generally to a driver circuit for electronic actuators and, more particularly, to a driver circuit for a plurality of coils which includes a means for sensing if a power source is connected in reverse polarity and responsively open circuiting a flyback path to prevent accidental energization of the coils.

BACKGROUND ART

In the field of engine-generators, it is common to utilize an electronic control module for sensing a variety of parameters and responsively controlling a plurality of electric actuators, such as coils in response to the sensed parameters. However, in such prior systems, it is possible for the coils to be inadvertently energized if electrical leads from the control module are connected incorrectly to a power source.

This problem can be better understood by referring to FIG. 1. FIG. 1 illustrates a driver circuit 10 for controlling a plurality coils 12. Two coils 12a,12b are shown for illustration purposes; however, the driver circuit can be used for any number of coils. The drive circuit 10 is part of an electronic control module (not shown). The control module forms no part of the subject invention and, therefore, it will not be described in detail. The driver circuit 10 includes first and second control switches 14a,14b, each being coupled in series between a first terminal 16a-16b of a respective coil 12a-12b and a first common junction 18. The first common junction 18 is normally connected to a positive reference terminal 20 of an electrical power source 22, such as a battery, by a first electrical conductor 21. The control switches 14a,14b are adapted to controllably connect the solenoid first terminals 16a-16b to the power source positive reference terminal 20 in response to control signals supplied by the control module, as is explained below. The control switches are commonly in the form of relays; however, numerous other switches such as bipolar or MOSFET transistors, could also be used.

The coils 12a,12b further have respective second terminals 24a-24b which are connected at a second common junction 26. The second common junction 26 is normally connected to a negative reference terminal 28 of the power source 22 by a second electrical conductor 30. First and second flyback diodes 32a,32b provide respective current flyback paths for the first and second coils 12a,12b during deenergization. The flyback diodes 32a,32b also prevent arcing across the control switches 12a,12b during deenergization of the coils 12a,12b. More specifically, each flyback diode 32a,32b has a cathode connected to a respective coil first terminal 16a,16b and an anode connected to a third common junction 34. The third common junction 34 is normally connected to the power source negative reference terminal 28 by a third electrical conductor 36.

Operation of the driver circuit will now be briefly described using an example. In the case of a normally-closed switch, such as the second switch 14b, the associated coil 12b is normally energized. If a condition is sensed, wherein it is desirable to deenergize the second coil 12b, the control module controllably opens the second control switch 14b. When this occurs, the second coil 12b is electrically disconnected from the power source positive reference terminal 20 and energy stored in the second coil 12b must be dissipated. The stored energy dissipates as current from the coil 12b circulates through the second flyback diode 32b. Operation of a normally open switch, such as first control switch 14a, is similar and will not be further described.

At least two undesirable conditions can occur, however, if the driver circuit 10 is incorrectly connected to the power source 22, as is illustrated in FIG. 1b. In FIG. 1b, the first and third common junctions 18,34 are connected to the negative and positive power source reference terminals 20,28. This type of connection will hereinafter be referred to as a reverse-polarity battery connection, and a connection as shown in FIG. 1a will hereinafter be referred to as a normal battery connection.

The first undesirable condition can occur in a normally open switch, such as the first control switch 14a. In this instance, the first coil 12a will be energized by the current path through the first flyback diode 32a. The severity of this type of fault depends on what the first coil 12a is used for. For example, if the first coil 12a is used to control a starting motor (not shown) on the engine, the engine may accidentally start. The second undesirable condition occurs in the case of a normally closed switch, such as the second control switch 14b. In this instance, a high level current will flow through the second control switch 14b. Fuses 38a,38b are typically connected between the control switches 14a,14b and the power source positive reference terminal 20 to prevent damage to the control switches 14a,14b in such an instance. The fuses 38a,38b are designed to fail before the current reaches a level that can damage the control switches 14a,14b. However, it is also possible for the diode 32b associated with the closed control switch 14b to fail during a reverse-polarity battery connection. In either instance, the control module is disabled, and the resulting loss in operation, as well as the cost of repairing the failed components make this an undesirable condition.

These problems could be avoided by using a harness-type connector to prevent a reverse-polarity battery connection. However, the generator market dictates that individual post-type connectors be provided on the control module. The above problems could also be solved by connecting the coil second terminals 24a,24b directly to the third common junction 34 and using single electrical conductor to connect the third common junction 34 to the power source positive reference terminal 28. However, the driver circuit 10 isn't typically in close proximity to the coils 12a,12b and, therefore, this type of connection is not readily attainable.

The present invention is directed to overcoming one or more of the problems as set forth above.

DISCLOSURE OF THE INVENTION

A driver circuit is provided for N solenoid coils of the type having respective first and second terminals. The coils are controllably energized by an external source of electrical power. The driver circuit includes N control switches each coupled in series between a first terminal of an associated one of the solenoid coils and a first common junction. The first common junction is normally connected to a positive reference terminal of the power source. The control switches are adapted to controllably connect the solenoid first terminals to the power source positive reference terminal in response to the externally supplied control signals. The coil second terminals are connected at a second common junction, and the second common junction is normally connected to a negative reference terminal of the power source.

The driver circuit further includes N flyback diodes each having a cathode connected to a respective coil first terminal and an anode connected to a third common junction. The third common junction is normally connected to said electrical power source negative terminal. A circuit is provided for sensing if the first and third common junctions are electrically connected respectively to the power source negative and positive reference terminals and responsively disconnecting the diodes from the third junction.

BRIEF DESCRIPTION OF THE DRAWING

FIG. 1a is an electrical schematic of an existing coil driver circuit having a normal battery connection;

FIG. 1b is an electrical schematic of an existing coil driver circuit having a reverse-polarity battery connection; and FIG. 2 is an embodiment of the immediate coil driver circuit having a normal battery connection.

BEST MODE FOR CARRYING OUT THE INVENTION

Referring now to FIG. 2 an embodiment of the immediate coil driver circuit 110 in a normal battery connection is discussed. The driver circuit 110 is capable of driving a plurality of coils, but for illustration purposes only first and second coils 112a,112b are shown. The driver circuit 110 controllably energizes the coils 112a,112b via an external power source 113 as explained below. The driver circuit 110 includes N control switches wherein N is equal to the number of coils. Therefore, first and second control switches 114a,114b are shown in FIG. 2. The control switches 114a, 114b are preferably in the form of relays; however, numerous other switches, such as bipolar or MOSFET transistors, could also be used.

Each control switch 114a,114b coupled in series between a first terminal 116a,116b of an associated one of the solenoid coils 112a,112b and a first common junction 118. The first common junction 118 is preferably in the form of a first post-type connector 119 which is normally connected to a positive reference terminal 120 of the electrical power source 113 by a first electrical conductor 122. The control switches 114a,114b are adapted to controllably connect the coil first terminals 116a,116b to the power source positive reference terminal 120 in response to externally supplied control signals. More specifically, the driver circuit 110 can be part on an electronic control module (not shown) which senses a variety of parameters and selectively energizes the coils 112a, 112b in response to the sensed parameters. The control module (not shown) forms no part of the immediate invention and, therefore, it will not be further discussed.

Each coil 112a,112b also has a second terminal 124a,124b connected at a second common junction 126. The second common junction 126 is preferably in the form of a second post-type connector 127 which is normally connected to a negative reference terminal 128 of the electrical power source by second electrical conductor 130. The driver circuit 110 further includes first and second flyback diodes 132a,132b each having a cathode connected to a respective coil first terminal 116a,116b and an anode connected to a third common junction 134 through a means 138. The third common junction 134 is preferably in the form of a third post-type connector 135 which is normally connected to the power source negative reference terminal 128 by a third electrical conductor 136. The means 138 is provided for sensing if the first and third common junctions 134 118, are electrically connected respectively to the power source negative and positive reference terminals 120, 128 and responsively disconnecting the diodes from the third junction, thereby preventing the problems set forth above.

The means 138 includes a switch 140 connected between the third common junction 134 and the diodes 132a,132b. The switch 140 is normally biased to a first position in response to the first and third common junctions 118,134 being connected respectively to the positive and negative reference terminals 120,128 (normal battery connection). When the switch 140 is at its first position, the diodes 132a,132b are electrically connected to the third common junction 134, thereby providing a flyback path for the coils 112a,112b. The switch 140 is further biased to a second position in response to the first and third common junctions 118,134 being connected respectively to the negative and positive reference terminals 128,120 (reverse-polarity battery connection). When the switch 140 is at its second position, the diodes 132a,132b are electrically disconnected from the third common junction 134, thereby preventing the problems set forth above.

The switch 140 is preferably an N-channel MOSFET 142 similar to that supplied supplied by Motorola, Incorporated as part number MTP50N05E. The MOSFET 142 has a gate connected between the first common junction 118 and the control switches 114a,114b, a source connected to the anodes of the diodes 132a,132b and a drain connected to the third common junction 134. The means 138 further includes a resistor 144 connected between the MOSFET gate and the first common junction 118, and a zener diode 146 connected between the third common junction 134 and the MOSFET gate. The values of the zener diode 146 and the resistor 144 are selected such that the MOSFET 142 is biased "on" during a normal battery connection, thereby providing a low resistance flyback path for the coils 112a,112b. More specifically, a preselected gate-to-source voltage potential $V_{GS}$ is required to bias a MOSFET "on". The preferred MOSFET requires at least a 4-volt gate-to-source potential before it becomes biased "on". Therefore, the values of the resistor 144 and the zener diode 146 are selected such that the gate-to-source voltage $V_{GS}$ at least exceeds 4 volts during a normal battery connection.

During a reverse-polarity battery connection, the gate-to-source voltage $V_{GS}$ never exceed 0.7 volts and the MOSFET remains biased "off". When the MOSFET 142 is biased "OFF", the flyback diodes 132a,b are disconnected from the third common junction 134 and the above-mentioned problems are avoided. A first diode 148 has an anode connected between the junction of the MOSFET's source and the flyback diodes 132a,132b, and a cathode connected between the junction of the resistor 144 and the MOSFET's gate. The first diode 148 clamps the gate-to-source voltage $V_{GS}$ at approximately 0.7 volts during a reverse-polarity battery connection thereby ensuring that the MOSFET 143 remains biased "off". A second diode 150 has an anode connected to the zener diode and a cathode connected to the third common junction. The second diode 150 is provided to block current flow through the zener diode 146 and the resistor 144 during a reverse-polarity battery connection.

A capacitor 152 is connected between the MOSFET gate and the MOSFET source. The capacitor 152 has three functions. First, during a reverse-polarity battery connection, it lowers the impedance of the MOSFET'S gate, thereby preventing the MOSFET 142 from being biased "on" by parasitic capacitance. Secondly, during a normal battery connection, it provides sufficient charge to keeps the MOSFET 142 biased "on" if the voltage supplied by the power sources 113 drops during engine cranking, for example. Finally, if supply voltage from the power source 113 is completely lost, the capacitor 152 keeps the MOSFET 142 biased "on" for a period of time sufficient for the coils 112a,112b to discharge through the flyback diodes 132a,132b.

Industrial Applicability

In the overall operation of the driver circuit 110, assume that the driver circuit 110 is part of an electronic control module (not shown) for an engine-generator unit (not shown). The electronic control module senses various parameters and responsively energizes a plurality of coils 112a,112b. For illustration purposes first and second coils 112a,112b are shown. Assume that the first coil 112a is used to energize a starter motor (not shown) on the engine and the second coil 112b, which is normally energized, controls an emergency fuel shutoff valve (not shown) on the engine.

Operation will first be discussed for a normal battery connection in connection with FIG. 2. If a normal battery connection is made, the MOSFET's gate-to-source voltage $V_{GS}$ is sufficient to bias the MOSFET 142 "on". When the engine is to be started, the electronic control module supplies a control signal to the first control switch 114a, thereby closing the first control switch 114a and energizing the first coil 112a. Energizing the first coil 112a drives the starter motor and starts the engine. When the engine starts, the control module stops delivering the control signal to the the first control switch 114a and the first control switch 114a is biased "off". When this occurs, the first coil 112a is disconnected from the power source positive reference terminal 120 and the first coil 112a discharges through the first flyback diode 132a. If a condition is sensed wherein it is desirable to stop operation of the engine-generator unit, the control module biases the second control switch 114b "off", thereby disconnecting the second coil 112b from the power source positive reference terminal 120. When this occurs, the second coil 112b discharges through the second flyback diode 132b via the MOSFET 142.

Conversely, during a reverse-polarity battery connection (not shown), the gate-to-source voltage $V_{GS}$ is insufficient for biasing the MOSFET "on". If such a connection were made using the prior systems (FIGS. 1a-b) at least two problems could occur. First, the first coil 12a could be energized by the current path through the first flyback diode 32a. If this occurs, the starter motor (not shown) could be actuated, and the engine could accidentally start. The second problem with the prior systems occurs in the case of a normally-closed switch, such as the second control switch 14b. In this instance, a high level current would flow through the second control switch 14b. An overcurrent fuse (38b) is typically provided to prevent damage to the second control switch 14b in such an instance. However, it is also possible for the second flyback diode 32b to fail.

In the immediate invention, the MOSFET 142 is biased "off" during a reverse-polarity battery connection. When the MOSFET 142 is biased "off", the flyback diodes 116a,116b are disconnected from the power source positive reference terminal 120 and the above-mentioned problems are avoided.

Other aspects, objects, and advantages of this invention can be obtained from a study of the drawings, the disclosure, and the appended claims.

We claim:

1. A driver circuit for N coils of the type having respective first and second terminals, and wherein said coils are controllably energized by an external source of electrical power, comprising:

N control switches each coupled in series between a first terminal of an associated one of said coils and a first common junction, said first common junction being normally connected to a positive reference terminal of said electrical power source, said control switches being adapted to controllably connect said coil first terminals to said power source positive reference terminal in response to said externally supplied control signals, said coil second terminals being connected at a second common junction, and said second common junction being normally connected to a negative reference terminal of said power source;

N flyback diodes each having a cathode connected to a respective coil first terminal and an anode connected to a third common junction, and said third common junction being normally connected to said power source negative reference terminal; and a switch connected between said third common junction and said diodes, said switch being biased to a first position in response to said first and third common junctions being connected respectively to said power source positive and negative reference terminals and a second position in response to said first and third common junctions being connected respectively to said negative and positive reference terminals, and wherein said flyback diodes are electrically connected to said third common junction when said switch is at said first position and said diodes are electrically disconnected from said third common junction when said switch is at said second position.

2. A driver circuit as set forth in claim 1 wherein said switch is an N-channel MOSFET having a gate connected between said first common junction and said control switches, a source connected to the anodes of said diodes, and a drain connected to said third common junction.

3. A driver circuit as set forth in claim 2 further including:

a resistor connected between said MOSFET gate and said first common junction; and
   a zener diode connected between said third common junction and said MOSFET gate.

4. A driver circuit as set forth in claim 2 further including a capacitor connected between said MOSFET gate and said MOSFET source.

5. A driver circuit as set forth in claim 2 further including a diode having an anode connected between the junction of said MOSFET source and said flyback diodes and a cathode connected between the junction of said resistor and said MOSFET gate.

* * * * *